US012287728B1

United States Patent
Spencer-Harper et al.

(10) Patent No.: US 12,287,728 B1
(45) Date of Patent: Apr. 29, 2025

(54) DETERMINISTIC REPLAY OF RECORDED USER INTERACTION AND EXECUTED EVENTS

(71) Applicant: Meticulous Ai Limited, London (GB)

(72) Inventors: Quentin Sean Spencer-Harper, London (GB); Gabriel Edward Spencer-Harper, London (GB); Aleksandar Ivanov, London (GB); Daniel Robert Book, London (GB)

(73) Assignee: Meticulous Ai Limited, London (GB)

( * ) Notice: Subject to any disclaimer, the term of this patent is extended or adjusted under 35 U.S.C. 154(b) by 0 days.

(21) Appl. No.: 18/820,979

(22) Filed: Aug. 30, 2024

Related U.S. Application Data

(60) Provisional application No. 63/540,043, filed on Sep. 22, 2023.

(51) Int. Cl.
  *G06F 11/36* (2006.01)
  *G06F 8/71* (2018.01)
  *G06F 11/3668* (2025.01)

(52) U.S. Cl.
  CPC ............ *G06F 11/3688* (2013.01); *G06F 8/71* (2013.01); *G06F 11/3684* (2013.01)

(58) Field of Classification Search
  CPC ..... G06F 8/71; G06F 11/3684; G06F 11/3688
  See application file for complete search history.

(56) References Cited

U.S. PATENT DOCUMENTS

| | | | | |
|---|---|---|---|---|
| 8,380,665 B2* | 2/2013 | Papadomanolakis | | G06F 11/3688 707/610 |
| 8,433,733 B2* | 4/2013 | Sayed | ................... | G06F 16/954 707/658 |
| 10,095,611 B1* | 10/2018 | Hanumanthappa | ......................... | G06F 11/3692 |
| 10,157,121 B2* | 12/2018 | Edwards | ............. | G06F 11/3612 |
| 10,664,389 B2* | 5/2020 | Shazly | ................ | G06F 11/3688 |
| 10,733,345 B1* | 8/2020 | Ovadia | .................. | G06F 11/261 |
| 10,884,903 B1* | 1/2021 | Barua | .................. | G06F 11/3664 |
| 11,023,363 B2* | 6/2021 | Lloyd | ................. | G06F 11/3438 |
| 11,023,642 B2* | 6/2021 | Chou | ....................... | G06F 30/33 |
| 11,119,899 B2* | 9/2021 | Shani | .................. | G06F 11/3684 |
| 2009/0307763 A1* | 12/2009 | Rawlins | ............... | G06F 11/2294 714/E11.002 |
| 2010/0180260 A1* | 7/2010 | Chikkadevaiah | ... | G06F 11/3664 717/125 |
| 2018/0173614 A1* | 6/2018 | Gong | .................. | G06F 11/3664 |

\* cited by examiner

*Primary Examiner* — Douglas M Slachta
(74) *Attorney, Agent, or Firm* — Cognition IP, P.C.; Edward Steakley; Schiller Hill

(57) ABSTRACT

Systems, tools and methods to allow for the deterministic replay of nondeterministic events and testing of interactions with systems and interfaces. The system may record or retrieve user sessions corresponding to a first version of an application or user interface and replay the events of the user session with a second version of the application or user interface. The system may test updates to code by comparing screenshots or outputs generated by the second version against those generated by the first version to identify unintended differences or errors. The sessions used to test the updates may also be generated by a script or by a machine learning model trained on previous user sessions.

27 Claims, 5 Drawing Sheets

DETERMINISTIC REPLAY OF RECORDED USER INTERACTION AND EXECUTED EVENTS

CROSS-REFERENCE TO RELATED APPLICATIONS

This application claims the benefit of priority to U.S. Provisional Application No. 63/540,043, filed on Sep. 22, 2023, which is hereby incorporated by reference in its entirety.

FIELD

The present invention relates generally to systems, tools and methods to allow for the deterministic replay and testing of interactions with systems and interfaces, wherein the interactions may be based on recorded user session, user/developer scripted sessions and machine learning (ML)/artificial intelligence (AI) generated sessions, and wherein the deterministic replay and testing further comprises executing events associated with those interactions.

BACKGROUND

Testing of browser and application based interfaces can be a difficult task. Identifying unwanted changes to the operation or appearance of the interface between an original piece of code and subsequent updates is made even harder when sources of nondeterminism are present. Since nondeterministic sources cause differences in the responses between execution of the same piece of code, identifying bugs or unintended changes to an updated piece of code is not possible.

SUMMARY

The system and methods described herein provide for interacting within an application. In some embodiments, the system may comprise a datastore module, operating on a server. The datastore module may be configured to store one or more applications, wherein each of the one or more applications may comprise one or more application versions, and wherein each of the one or more application versions may comprise one or more test sessions, wherein each of the one or more test sessions may comprise a list of one or more user actions and wherein each of the one or more user actions may be paired with an offset timestamp.

In some embodiments, the system may further comprise a queue module, wherein the queue module may be configured to: retrieve, from the datastore module, a first test session; generate an event queue based on the first test session, wherein the event queue may comprise a chronologically ordered list of replay events, wherein the event queue may further comprise a head event corresponding to the replay event that is next in line to be replayed; associate each replay event with a replay timestamp, wherein the replay timestamp is based on the offset timestamp of the corresponding user action, and wherein the head event is initialized to 0 ms.

In some embodiments, the system may further include a replay module configured to interact with the application through executing, by the application, the event queue corresponding to the first test session and wherein the replay module may be further configured to: initialize a simulated timestamp to 0 ms, wherein the simulated timestamp replaces a real-world timestamp associated with execution of replay events and wherein execution of replay events that execute date or time functions result in the simulated timestamp being returned; identify a next replay event to execute based on the simulated timestamp and the replay timestamps associated with the replay events in the event queue, wherein the replay event associated with the replay timestamp nearest the simulated timestamp is the next replay event; update the simulated timestamp to the replay timestamp associated with the next replay event in the queue; pop the next replay event off the event queue; execute the popped replay event, wherein if the executing spawns one or more new replay events, the new replay events may be inserted into the event queue at positions corresponding to replay timestamps of the new replay events; and repeat the popping of the next replay event off of the event queue and executing of the popped next replay event until the event queue is empty.

In some embodiments, the replay timestamp of the new replay events may be determined based on event details corresponding to the new replay events or the replay event that spawned the new replay events, and/or a type of action performed by the replay event that spawned the new replay events and/or by a type of action to be performed by the new replay events.

In some embodiments, the replay timestamp of each of the new replay events may be equal to a specified delay added to the simulated timestamp, wherein the specified delay may be specified by the replay event that spawned the new replay event or by the new replay event.

In some embodiments, the replay timestamp of the new replay events may be equal to the simulated timestamp plus a recorded delay corresponding to the replay event that spawned the new replay event in the first test session.

In some embodiments, the replay event may be a network request and the new replay event may be a new network response; and wherein the specified delay corresponding to the new network response may be calculated by identifying a closest matching network request in the first test session and calculating an amount of time between sending of the identified closest matching network request and receiving an associated response in the first test session.

In some embodiments, the replay module may further be configured to: identify one or more pending actions, calculations or replay event executions that take a non-deterministic amount of time to complete; and pause the updating of the simulated timestamp, the popping of the next replay event and the execution of the next replay event until the identified one or more pending actions, calculations or replay event executions have completed.

In some embodiments, the one or more pending actions, calculations or replay event executions may comprise executing code, callbacks, waiting for network responses, parsing network responses, waiting for additional scripts or code to load, parse and execute, and rendering animations.

In some embodiments, the replay module may be further configured to: identify one or more sources of non-determinism corresponding to the popped replay event, wherein the one or more sources of non-determinism may include non-deterministic function calls; intercept the non-deterministic function calls; and replace the non-deterministic function calls with calls to one or more predetermined deterministic functions.

In some embodiments, the non-deterministic function calls may be animation requests, wherein the animation requests may generate one or more callbacks and wherein the generated one or more callbacks may be stored in a separate callback queue.

In some embodiments, the replay module may further be configured to trigger a simulated animation frame, wherein the triggering may comprise: increasing a simulated animation time variable by a predetermined amount; passing the simulated animation time to the callbacks stored in the callback queue; triggering the callbacks using the passed simulated animation time; and clearing the callbacks stored in the callback queue. The one or more test sessions may further comprise a list of one or more user actions. The one or more test sessions may correspond to previously recorded user sessions, script generated test sessions or AI generated test sessions. The one or more test sessions may further comprise one or more network request/response pairs corresponding to user actions in the list of one or more user actions and wherein each of the request/response pairs may be associated with a time delay corresponding to a duration of time between a request being made and a response being received.

In some embodiments, the replay module may be further configured to: pause and wait for any open network requests to complete before popping the next replay event off of the event queue, wherein the completing may comprise receiving responses corresponding to the open network requests and parsing of the responses.

In some embodiments, the replay module may further be configured to take one or more snapshots of a state of the application following or preceding execution of key user actions. The key user actions may correspond to user actions that result in a document object model (DOM) change since a previous snapshot was taken. Each of the one or more snapshots may comprise a screenshot of the application, a dump of the DOM model, execution logs or performance logs.

In some embodiments, the replay module may further comprise an infinite loop detection module, the infinite loop detection module may be configured to: monitor execution of each replay event in the event queue; determine that an infinite loop is present, wherein the determining may be based on identifying a predetermined number of repeated executions of date or time functions that return an unchanged simulated timestamp value; break the infinite loop, wherein breaking the infinite loop may comprise: temporarily modifying the simulated timestamp returned by execution of the date or time functions, wherein the modifying may comprise adding or subtracting a predetermined value to the simulated timestamp; switching between the modified simulated timestamp and the unmodified simulated timestamp after a second predetermined number of executions of time or date functions; and throw an error after a third number of predefined executions have been performed that return the modified simulated timestamp or the unmodified simulated timestamp.

In some embodiments, the replay module may further be configured to: execute, by a first application version and a second application version, a set of test sessions; record, for the first application version and the second application version, snapshots of the state of the applications, events or metrics when executing the set of test session; compare, by a version comparison module operating on the replay module, the snapshots of the state of the applications, events or metrics corresponding to the first application version with the snapshots of the state of the applications, events or metrics corresponding the second application version; and generate a notification when the second application version generates different results to the first application version.

In some embodiments, the replay module may further be configured to record data for the first application version and the second application version, wherein the recording of data for the first application version and the second application version may comprise: recording one or more errors or warnings thrown, logged or generated for each of the first application version and the second application version when executing the set of test session; recording screenshots of the first application version and second application version when executing the set of test session; or recording metrics of the performance of the first application version and the second application version, wherein the metrics may comprise: slow frames; time to interactive; number of re-renders; number of forced synchronous layouts; accessibility scores; or search-engine optimizations; and compare, by the version comparison module, the data recorded for the first application version with the data recorded for the second application version; and generate, based on the comparing the data recorded for the first application version and the data recorded for the second application version, a notification of any notable changes in that recorded data.

In some embodiments, the queue module may further be configured to: select, for a first application version, one or more test session to execute based on one or more selection criteria, and wherein the selection criteria may comprise: source code coverage; URL patterns; execution time; and replay accuracy.

In some embodiments, the server may further be configured to compute, for each of the one or more applications, a current golden set of sessions and a timestamp corresponding to computing the current golden set; and wherein the current golden set may be computed based on one or more selection criteria.

In some embodiments, the server may further be configured to compute, for an updated application, an updated golden set of sessions and a timestamp corresponding to computing the updated golden set, and wherein computing the updated golden set may comprise: finding new candidate sessions, wherein finding new candidate sessions may comprise identifying test sessions that have been added to the updated application since the timestamp of the current golden set; generating a set of replay sessions, wherein the replay sessions may comprise the new candidate sessions and the current golden set of sessions; replaying the set of replay sessions; computing a score for each replay session; selecting, based on the score, the updated golden set of sessions; and storing the updated golden set of sessions and a current timestamp corresponding to the updated golden set of sessions.

In some embodiments, the replay module may further be configured to execute, by a first application version and a second application version, a set of test sessions; record, for the first application version and the second application version, when executing the set of test session, a plurality of screenshots of the applications along with plurality of snapshots of the state of the applications at the time of screenshotting; compare, by a version comparison module operating on the replay module, each of the plurality of screenshots and the plurality of state snapshots corresponding to the first application version with the plurality of screenshots and the plurality of state snapshots of the state of the applications corresponding the second application version; and classify the plurality of these comparisons into one or more groups, based on the screenshots or the state snapshots from when the screenshot was taken; and display, for each of the one or more groups, one or more representative screenshots to a user.

In some embodiments, when each screenshot is recorded the system may record snapshots of the DOM at that point in time and/or details of lines/characters of application code executed since the prior screenshot was taken. The version comparison module may further be configured to compare the DOM snapshots between the first and second application version, wherein the DOM snapshot comparison may further comprise generating a 'DOM change signature', where the DOM change signature strips out data, text or variations in the number of repeated elements that vary without bound across user sessions while preserving elements that differentiate between different code paths and edge cases having been activated. The classifying may further be based on the lines/characters of application code executed since the prior screenshot or based on the DOM change signatures.

In some embodiments, when each screenshot is recorded the system may be configure to either record snapshots of the DOM at that point in time or details of lines/characters of application code executed since the prior screenshot was taken, not both.

In some embodiments, the system may be configured to detect all HTML class names present in the DOM elements close to where differences were spotted, sort the class names, and hash the result.

In some embodiments, the system may further comprise a machine learning module, wherein the machine learning module may be configured to generate AI generated test sessions, and wherein the generating a new AI test session may comprise: creating a user action list for the new AI test session, wherein the user action list is a chronologically ordered list; creating a current session state of the new AI test session; analyzing the current session state; generating an action/executed map for the current session state, wherein the action/executed map may comprise a list of action pairs and wherein each action pair may comprise an action taken and a produced state; generating, based on the analysis, a list of alternate actions that can be taken from the current session state; identifying, from the list of alternate actions, a set of filter actions wherein the set of filter actions may comprise reversible actions, non-mutating actions or non-destructive actions; identifying a set of unexecuted actions, wherein the identifying may comprise comparing the set of filter actions to the action/executed map; selecting an unexecuted action from the set of unexecuted actions; executing the selected unexecuted action; adding the selected unexecuted action to the user action list; adding, for the current session state, the selected unexecuted action to the action/executed map; and repeating, while the set of unexecuted actions is not empty, a predefined session length limit has not yet been reached or a predetermined search depth has not yet been reached, the identifying, selecting and executing of unexecuted actions and adding the selected unexecuted action to the user action list and the action/executed map of the current session state.

In some embodiments, the produced state may correspond to a URL pattern, and the action taken may correspond to descriptors of buttons that are clicked or elements that are interacted with. As an illustrative example, the 'state' could be a URL pattern, and the actions could be descriptors of buttons that can be clicked and elements that can be interacted with. The system may therefore store in the action/executed map the list of elements interacted with for each URL pattern so that the system does not go in loops or explore interactions on pages that have already been explored.

In some embodiments, the machine learning module may further be configured to expand previously recorded user sessions and script generated test sessions.

In some embodiments, the system and methods described herein may provide for the recording and replaying of user interaction within an application. In some embodiments, the system may comprise a datastore module, wherein the datastore module may be configured to store a list of one or more user actions, wherein the list of one or more user actions may correspond to an original recorded session. The system may pair each of the one or more user actions in the list with an offset timestamp, store a list of recorded network request/response pairs corresponding to the original recording session and pair each of the request/response pairs with a time delay corresponding to a duration of time between a request being made and a response being received.

In some embodiments, the system may further comprise a queue module, wherein the queue module may be configured to retrieve, from the datastore module, the list of one or more user actions, generate an event queue based on the list of one or more user actions, wherein the event queue comprises a chronologically ordered list of replay events, wherein the event queue further comprises a head event corresponding to the replay event that is next in line to be replayed. The queue module may further be configured to associate each replay event with a replay timestamp, wherein the replay timestamp may be based on the offset timestamp of the corresponding user action, and wherein the head event may be initialized to 0 ms.

In some embodiments, the system may further comprise a replay module, the replay module configured to initialize a simulated timestamp to 0 ms, identify a next replay event to execute based on the simulated timestamp and the replay timestamps associated with the replay events in the event queue, wherein the replay event associated with the replay timestamp nearest the simulated timestamp is the next replay event, pop the next replay event off the event queue, execute the popped replay event, wherein if the executing spawns a new replay event, the new replay event is inserted into the event queue at a position corresponding to a replay timestamp of the new replay event, update the simulated timestamp to the replay timestamp associated with the next replay event in the queue and repeat the popping of the next replay event off of the event queue and executing of the popped next replay event until the event queue is empty.

In some embodiments, the replay timestamp of the new replay event may be determined based on a type of action performed by the replay event that spawned the new replay event or by a type of action to be performed by the new replay event.

In some embodiments, the replay timestamp of the new replay event may be equal to a specified delay added to the simulated timestamp, wherein the specified delay may be specified by the replay event that spawned the new replay event or by the new replay event.

In some embodiments, the replay timestamp of the new replay event may be equal to the simulated timestamp plus a recorded delay corresponding to the replay event that spawned the new replay event in the original recorded session.

In some embodiments, the replay event may be a network request and the new replay event may be a network response, and wherein the recorded delay may be the duration of time between the request being made and the response being received.

In some embodiments, the replay module may further be configured to identify one or more pending actions, calculations or replay event executions that take a non-deterministic amount of time to complete and pause the updating of the simulated timestamp, the popping of the next replay event and the execution of the next replay event until the identified one or more pending actions, calculations or replay event executions have completed.

In some embodiments, the one or more pending actions, calculations or replay event executions may comprise executing code, callbacks, waiting for network responses, parsing network responses and rendering animations.

In some embodiments, the replay module may further be configured to identify one or more sources of non-determinism corresponding to the popped replay event, wherein the one or more sources of non-determinism may include non-deterministic function calls. The replay module may then intercept the non-deterministic function calls and replace the non-deterministic function calls with calls to one or more predetermined deterministic functions.

In some embodiments, the non-deterministic function calls may be animation requests, wherein the animation requests may generate one or more callbacks and wherein the generated one or more callbacks may be stored in a separate callback queue.

In some embodiments, the replay module may further be configured to trigger a simulated animation frame. The triggering may comprise increasing a simulated animation time variable by a predetermined amount, passing the simulated animation time to the callbacks stored in the callback queue, triggering the callbacks using the passed simulated animation time and clearing the callbacks stored in the callback queue.

In some embodiments, the system may further comprise a client device and a server. The client device may be configured to record a user execution of a first application version. The client device may further comprise a recording interface module, wherein the recording interface module may further be configured to capture one or more session events. The one or more session events may comprise a user event, an execution event or an execution response. The recording interface module may create a user session based on the one or more session events. The user session may comprise an ordered list of timestamped session events. The recording interface module may further be configured to store the user sessions in the datastore module.

In some embodiments, the replay module may be configured to retrieve, from the datastore module, one or more user sessions associated with the first application version. The replay module may further generate, for each user session, an event queue of user actions.

In some embodiments, the replay module may further be configured to replay, for the first application version and a second application version, the replay events in the event queue for each user session.

In some embodiments, a screenshot corresponding to the execution of the current replay event may be taken. In some embodiments, the system may be configured to compare, for each key replay event of each user session, a corresponding screenshot for the first application version and the second application version. The comparing may comprise identifying one or more visual differences. An indication of the one or more visual differences may then be displayed to the user.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
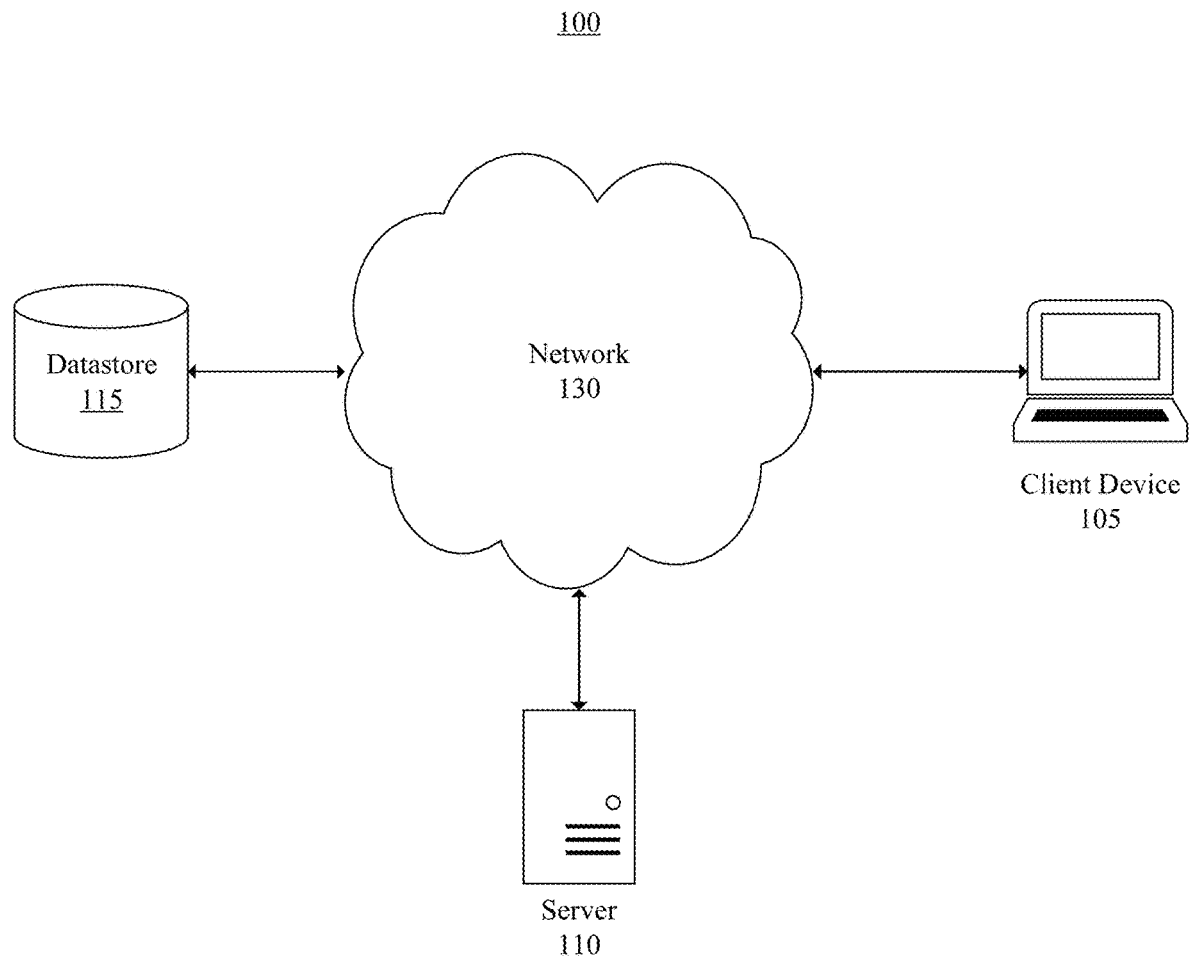
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, platform and methods for deterministic replay of one or more sources of nondeterminism, such as nondeterministic events and responses of a recorded user session, user/developer scripted test session, ML/AI generated test session or combination thereof. The term "nondeterministic events" may be used to describe any source of nondeterminism. In some embodiments, the system, platform and methods may be configured to record user sessions, either from production users or internal users, replays those sessions before and after each code change, takes screenshots at key points, compares those screenshots and alerts the developer of any differences, so that they can review the differences and check that they are intended before they ship their code change.

In some embodiments, end to end tests may be written by a developer as one or more testing scripts, wherein these scripts are configured to execute an old version of code and a new version of code being tested. In some embodiments, the testing scripts may simulate user activity while interacting with the code. For example, the testing scripts may be configured to simulate one or more clicks on one or more intended buttons in an application. The application may be a web based application, standalone desktop application, mobile application or other any other application which receives input and produces output. In some embodiments, the script may include assertions about the results of the code execution, such as the HTML that gets rendered on a web application.

In some embodiments, the execution of nondeterministic events, such as rendering, network requests and parsing may be identified by the system, in the recorded user sessions, developer written testing scripts (scripted test sessions) and ML/AI generated testing sessions. The identified nondeterministic events may be automatically converted, replaced, mocked, or simulated by the system in a deterministic manner, allowing for the consistent execution of the testing on both the original version of code and the new version of code. The automatic converting may allow for more automated testing between code versions since the developer would not need to manually add fixed 'sleep' or 'wait' statements that specify a fixed amount of time, to ensure that rendering, network requests and parsing have completed before the next step is executed. In some embodiments, the automatic conversion of nondeterministic events may take into consideration responses and changes to an interface, such as waiting for button to appear. The handling of the nondeterministic events may be accomplished by using a fake timestamp with a simulated time to control the order and timing of the execution of events, instead of applying a conditional wait for the completion of an event, such as the rendering of a button on the user interface.

In some embodiments, the code versions being tested may be run based on the progression of the simulated time. The rate of progress of the simulated time may be controlled by the system and not correspond to real-time execution. In some embodiments, the simulated time progresses in a relative manner between different events. In some embodiments, one or more events may be executed at a first fake timestamp, and the simulated time may be configured to increment to a second fake timestamp after the events have been completed and responses have been received for the executed events. For example, the incrementing of the simulated time may take less time or more time than the actual time required for execution since no matter how long execution takes for the events at the first fake timestamp, the simulated time moves to the second fake timestamp only after all events, callbacks and/or responses executed at the first timestep are completed.

In some embodiments, the system may be configured for reliable and consistent screenshot generation. The system may ensure that a screenshot is taken at the same point relative to the other events, the events execute in the same order, and there is no nondeterministic input into the system.

FIG. 1 is a diagram illustrating an exemplary deterministic playback system 100 in which some embodiments may operate. The deterministic playback system 100 may comprise one or more client devices 105, one or more servers 110, one or more datastores 115 and one or more networks 130.

The client devices 105 may be any computing device capable of communicating over network 130. The client devices 105 may be integrated into a notebook computer, smartphone, personal digital assistant, desktop computer, tablet computer, or other computing device.

Server 110 may be one or more physical or virtual machines configured to communicate with the one or more client devices 105 and the one or more datastores 115. The one or more servers 110 may be configured as a distributed computing infrastructure and processing of applications and other software may be carried out on the cloud.

Datastores 115 may communicate with one another over network 130. Datastores 115 may be any storage device capable of storing data for processing or as a result of processing information at the client devices 105 and/or servers 110. The datastores 115 may be a separate device or the same device as server 110. The datastores 115 may be located in the same location as that of server 110, or at separate locations.

Network 130 may be an intranet, internet, mesh, LTE, GSM, peer-to-peer or other communication network that allows the one or more servers 110 to communicate with the one or more client devices 105 and datastores 115.

Figure 2A:
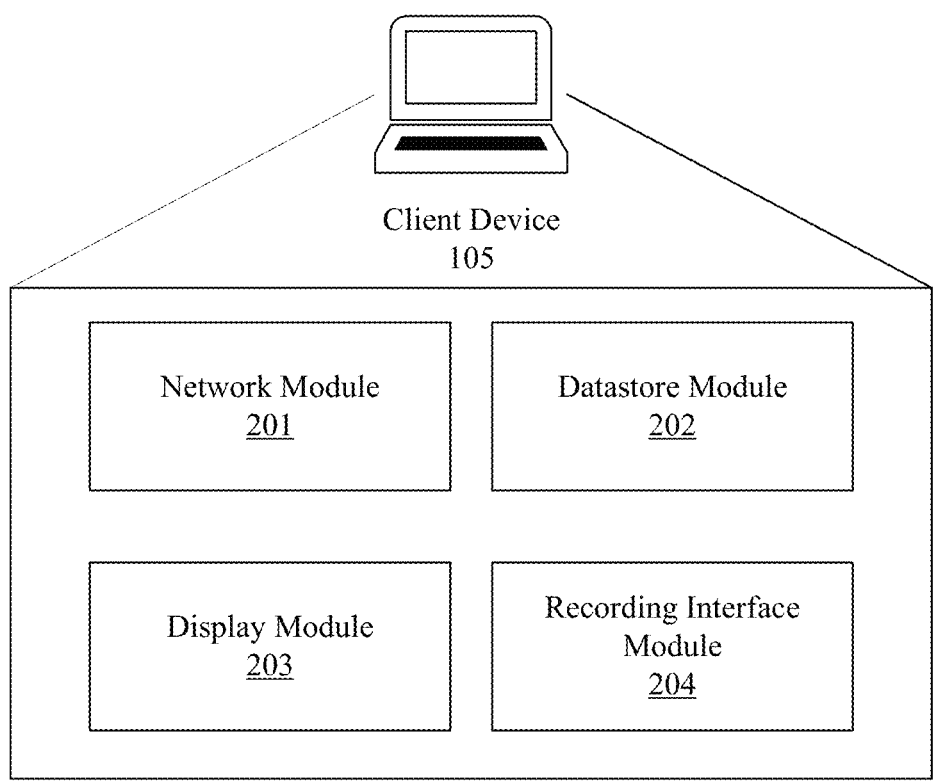
FIG. 2A is a diagram illustrating an exemplary client device in accordance with aspects of the present disclosure.

FIG. 2A is a diagram illustrating an exemplary client device 105 in accordance with aspects of the present disclosure. Client device 105 may comprise network module 201, datastore module 202, display module 203 and a recording interface module 204. Network module 201 may transmit and receive data from other computing systems via a network. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating on the client device 105. The one or more modules operating on the client device 105 may also retrieve information from the datastore module 202.

Display module 203 may be any device configured to display graphical representations of information (LCD display, OLED display, DLP display, etc.).

Recording interface module 204 may be configured to record one or more events corresponding to a user session during the execution of an application or user interface. User based events such as mouse clicks, scroll events and keyboard events may be recorded. In some embodiments, network requests and responses and animation renderings, may also be recorded.

Figure 2B:
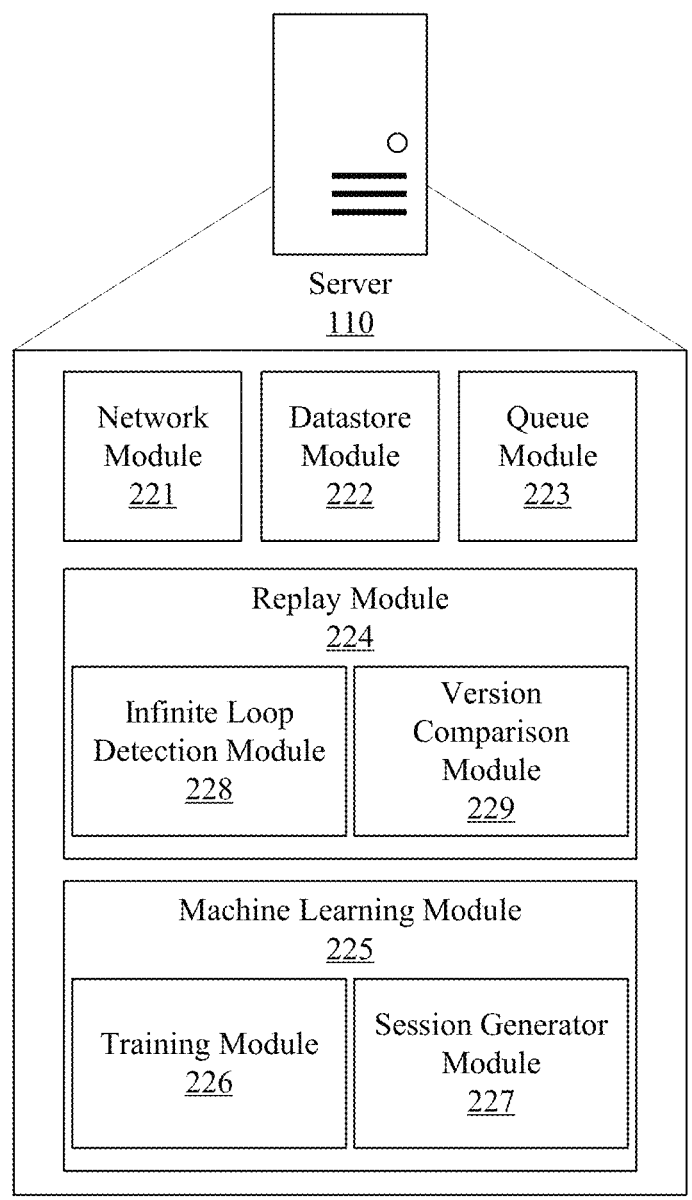
FIG. 2B is a diagram illustrating an exemplary server in accordance with aspects of the present disclosure.

FIG. 2B is a diagram illustrating an exemplary server 110 in accordance with aspects of the present disclosure. Server 110 may comprise network module 221, datastore module 222, queue module 223, replay module 224 and machine learning module 225.

Network module 221, may be the same or similar to that of network module 201 in FIG. 2A and will not be described for the sake of brevity.

Datastore module 222 may be configured to store a list of recorded user events (clicks etc.), each paired with a timestamp offset from the start of the test session. The test session may be a previous user recorded session, a user/developer scripted test session, a ML/AI generated test session or combination thereof. Datastore module 222 may also store a list of recorded network request/response pairs from the test session, and the time delays between the requests being made in the test session and the responses being received. At replay time the appropriate responses may be replayed when matching network requests are detected. The replaying may simulate the same delays corresponding to the recorded responses. In some embodiments, datastore 115 may be used in place of, or in combination with the datastore module 222. In some embodiments, datastore module 222 may be the same as datastore 115 and used in the same manner. In some embodiments, datastore module 222 may store copies or mirror the records to be used by the queue module 223, replay module 224 and/or machine learning module 225.

Queue module 223 may be configured to retrieve a list of one or more user actions from the datastore module 222 and generate an event queue based on the list of one or more user actions, wherein the event queue comprises a chronologically ordered list of replay events, wherein the event queue further comprises a head event corresponding to the replay event that is next in line to be replayed. The queue module 223 may further be configured to associate each replay event with a replay timestamp, wherein the replay timestamp is based on the offset timestamp of the corresponding user action, and wherein the head event is initialized to 0 ms.

In some embodiments, the queue module 223 may further be configured to select a plurality of test sessions to be replayed for an application. The selection of the plurality of test sessions may also be performed by other modules on the server 110, client device 105, datastore 115 or any other device, commutatively coupled to the server 110 over network 130. In some embodiments, there may be a large number of possible test sessions to execute, but a limited compute budget. In some embodiments, the replay module 224 may not be able to execute all test sessions within a reasonable amount of time. The queue module 223 may select a subset of the plurality of test sessions. In some embodiments, test sessions may be selection so that as many distinct edge cases of the applications code are covered. In some embodiments, sessions may be selected in a manner to maximize application code covered while minimizing the overlap of code coverage between test sessions. Source code coverage may be based on the characters of the source code which gets executed when a test session is executed against the application.

In some embodiments, URL patterns may also be used in the selection process. The URL patterns may correspond to URL patterns that get visited when the test session is executed. In some embodiments, there may be many different URLs for different objects, actions, categories, classifications or the like. For example, there may be many different URLs for different orders, but they all may use the same code and map to the same order page. In this case we may want to include a couple of test sessions per unique URL pattern, rather than a couple of test sessions per unique URL. For example, a URL pattern such as "https://www.abc.abc/your-orders" may correspond to many URLs with that pattern, such as "https://www.abc.abc/your-orders/202-80-28220".

In some embodiments, a web application framework, API or plugin may be directly integrated with a web framework to detect the URL patterns.

In some embodiments, heuristics may be used to compute the route pattern from the URLs. For example, the URLs may be split into their components. The components may include components of the path, different query parameters, different query values or combination thereof and may be replaced with <id>. The replacing may be performed in the event that the components comprise just numbers or if they have a numeric character followed by a non-numeric character. In some embodiments, a large language model may be used. The large learning model may be trained on one or more datasets. The datasets may be labeled or unlabeled, and the training may be performed in a supervised, unsupervised or partially supervised manner. The dataset may comprise one or more pre-written examples of URLs and their corresponding mappings (labels) to URL patterns. The pre-written examples may be fixed or variable. The large language model may be provided with a user or developer provided prompt, the dataset and a set of URLs to find patterns for. The large language model may then be asked to output one or more patterns for the given set of URLs. In some embodiments, the model may be fine-tuned by creating a dataset from one or more recorded sessions, scripted sessions or AI generated sessions, wherein the sessions expose both URLs and URL patterns.

In some embodiments, selection may also be at least partly based on execution time and replay accuracy. Execution time may correspond to the time required to execute the session using the simulated timestamp. The execution time may be significantly reduced when using the simulated timestamp versus the original recording session at the time of recording and/or the execution using timestamps corresponding to real-world time. Replay accuracy may correspond to whether the test session replays correctly. In some embodiments, the replay accuracy may be based on whether the same URL patterns are visited during replay as those hit when the original session was recorded. Replay accuracy may further be based at least in part on a determination that the UI components to click on still exist and the network requests made have matching requests stored. For example, since the application may change over time (including the UI components visible on the page, and the network requests the application makes) old sessions may no longer be replayable on new versions of the application. These sessions that are not replayable may be filtered out and/or removed from a list of candidate test sessions.

In some embodiments, a 'golden' set of sessions may be generated, modified and/or stored. A timestamp corresponding to when this golden set of sessions was computed may also be stored. When a new code change is proposed, the golden set of sessions may be executed/replayed on the corresponding version of the application before and after the code change, and the results compared. This may allow for a developer to check for changes caused by addition, removal or modifications to the code of an application version being worked on. This execution/replay may also be performed on an old version and new version of an application to determine changes between committed, released or branched versions. The ability to execute/replay the golden set of sessions, both during development of a version and after the completion of a version, allows for a more efficient development cycle. Iterative execution/replay of the golden set during the development of a version may be used to detect bugs in real-time. In some embodiments, the execution/replay of sessions covering the code being modified by a developer may be performed automatically during the modification of the code. An indication of possible errors, bugs or changes resulting from the modification may be generated at predetermined times or in response to actions performed by the developer during modification, addition and/or deletion of code. In some embodiments, the actions may correspond to key presses, mouse inputs, macro executions or other detectable input from the developer. In some embodiments, the execution/replay during the developer interaction with the application may be triggered by events such as an autosave event, manual save event, execution or debugging of a code section, completion of a class, method, function or other code structure or combination thereof.

In some embodiments, the golden set of sessions may be maintained through a process of finding new candidate sessions, replaying some or all the new candidate sessions to get code coverage and computing a numerical score corresponding to the amount of code covered and the amount URL patterns covered.

In some embodiments, all sessions that have been newly added (e.g., newly recorded) since the golden set of sessions was last computed, may be identified and/or added to a list of new candidate sessions. The list of new candidate sessions may be filtered to reduce the number of sessions available for selections. For example, if there are more than N new candidate sessions (say 300), the top N of these that cover the maximum possible set of URL patterns may be identified/added to list of new candidate sessions, while all other sessions may be filtered out. In some embodiments, the selection process may comprise determining the session that covers the most distinct URL patterns, then select the next session that covers the most additional distinct URL patterns not already covered by a previously selected session and repeating the process until a predetermined amount of distinct URL patterns are covered by the set of N new candidate sessions. The 'new-candidates' and the current golden set of sessions may be replayed against one or more versions of the application, and a record may be kept, for each session, corresponding to which URL patterns get visited and which characters of code get executed. The set of new candidates and current golden set session may be combined to generate an all candidate sessions set, wherein the all candidate sessions set comprises, for each session, the record of URL patterns visited and character code executed.

In some embodiments, a score may be computed for each of the session in the all candidate session set. The score may be based at least in part on the number of unique URL patterns seen when replaying the session, the number of new code characters covered, the amount of time needed to replay the session or combination thereof. In some embodiments, if the number of unique URL patterns seen when replaying the session is less than the number of unique URL patterns seen at time of creation or previous execution/replay (i.e., original recording, first/previous running of a scripted session, first/previous running of an ML/AI generated session), the score may be reduced. This may also be applied to code coverage as well. This may be used to prioritize sessions that maintain or increase their coverage of the code and URL paths over those which are trending in a downward trajectory. A trending weight may also be calculated for the sessions based on one or more previous executions/replays of a session and the most current execution/replay. Sessions which have a higher trending weight (coverage is trending in a positive direction) may be more likely to be chosen when computing/updated the golden set over those with a lower trending weight (coverage is trending in a negative direction). In some embodiments, the golden set of sessions may be computed at any time. To compute/update the golden set of sessions, some or all of the current golden set of sessions may be removed and replaced with new sessions from the all candidate sessions set. If more than a predetermined number of sessions are removed from the golden set of sessions, the sessions of the all candidate sessions set may be executed/replayed to double check the results of the computed scored. In some embodiments, sessions from one or more previously computed golden sets of sessions may be added to the all candidates sessions set and each of the sessions may then be executed/replayed and scored. The golden set of sessions may then be computed based off of those scores. In some embodiments, a predetermined number of previously computed golden sets of sessions may be used in the computing of a new/updated golden set of sessions. In some embodiments, the predetermined number of previously computed golden sets of sessions may be used only after a predetermined conditioned is met, such as removing more than a predetermined number of sessions from the golden set of sessions (i.e., ⅓ of the sessions are discarded). The discarding/removal of sessions from the current golden set of sessions may be equivalent to not selecting the same sessions when computing/updating the golden set of sessions. For example, when computing the new/updated golden set of sessions, removing ⅓ of the sessions from the current golden set of sessions may be considered equivalent to selecting ⅔ of the sessions from the current golden set of sessions.

Replay module 224 may comprise infinite loop detection module 228 and version comparison module 229. Replay module 224 may be configured to keep a simulated timestamp, starting at 0 ms, and keep a queue of events to execute, in time order, marked with the simulated timestamp to execute them at. In some embodiments, whenever setTimeout, setImmediate, setInterval, requestIdleCallback etc. is called, the replay module 224 may add an event to the queue at the current simulated timestamp plus the delay specified in the call. Whenever a network request is made, the replay module 224 may add an event to the queue to resolve the request at the current simulated timestamp plus the delay recorded for the original response.

In some embodiments, the replay module may be configured to execute the queue in order, popping and executing the nearest event off the queue at a time (the head of the sorted queue). Each time an event is executed, it may add new events or callbacks to the queue, which potentially could change the event at the head of the queue. The new events may be placed into the queue based on an execution timestamp of the new event. The queue may be sorted and updated until the simulated timestamp of the next user event (e.g., click) and then the next user event may be executed, and the process repeated.

In some embodiments, before executing an event from the queue, or a user event, the simulated timestamp may be updated to be at least as high as the timestamp of the new event. This may ensure that any code querying the timestamp (calling Date.now( )) etc. gets the correct timestamp and that any new setTimeouts scheduled get given a correct 'execute at' timestamp for insertion of the callback in the queue, by adding the delay specified in the call to the current simulated timestamp.

In some embodiments, before moving to the next event in the queue, the replay module may be configured to implement logic to guarantee that no pending computation is running, in the browser or an external system, which could modify the head of the queue. This forces the replay module to return deterministic results by pausing to fully wait for anything that takes a non-deterministic amount of time (executing code, callbacks, waiting for network responses, parsing network responses etc.), and only continues after all such pending processes complete.

In some embodiments, the correct interleaving of events may be ensured through the use of the timestamped queuing. For example, if a network request is made at 1000 ms, whose recorded response includes a delay of 2000 ms (so scheduled to resolve at 3000 ms), and a setTimeout call is made at 1500 ms with a specified delay of 500 ms (so scheduled to resolve at 2000 ms), and we wait for the network response to be received and parsed, then no matter how long we have to wait for the network response, the setTimeout callback executes before the triggering of events and callbacks related to the network response being ready.

In some embodiments, Math.random( ) and other random number generation may be mocked out or simulated, using a deterministic random number sequence. In some embodiments, the deterministic random number sequence may be unique for each distinct script that calls Math.random( ) to ensure that a variation in the number of Math.random( ) calls performed by one script (e.g., due to a developer changing the code) does not affect the numbers generated for another script.

After processing each queue event, the replay module 224 may call waitUntilDOMStopsChanging. This may repeatedly wait on a macro-task and trigger a simulated animation frame until its MutationObserver does not detect any DOM updates between the previous frame and the current frame, up to a maximum number of frames (i.e., 5). This may allow the replay module 224 to ensures that animations are complete, the DOM is up to date and all micro-tasks that may trigger a new callback to be added to the event queue have executed.

In some embodiments, the replay module 224 may further be configured to intercept requestAnimationFrame calls and store the provided callbacks in a separate queue. Whenever a simulated animation frame is triggered in each iteration of waitUntilDOMStopsChanging the replay module may call and clear the stored callbacks. The replay module 224, in essence, lies to the application, because no real animation frame has actually been completed, and there has most likely been no layout/paint etc. Not waiting for a real animation frame to complete after processing each queue event makes and using a simulated animation frame reduces the time replay time of the events.

In some embodiments, the replay module may be configured to wait for real animation frames before taking a screenshot to ensure that the layout/paint etc. is up to date.

In some embodiments, the replay module may be configured to trigger a simulated animation frame, wherein the triggering may increase a simulatedAnimationTime variable by a predetermined amount of time (i.e., 1000 ms), and pass this into the requestAnimationFrame callbacks that are triggered after that animation frame. This accelerates the replay of the animations, which normally use the timestamp passed into their requestAnimationFrame callback to work out how far to move the animation along by. For example, waitUntilDOMStopsChanging waits a maximum of 5 frames, this means in one cycle we complete any animations that have a duration of under 5000 ms.

In some embodiments, a minimum delay for setTimeout and setInterval calls may be set etc. (i.e., 30 ms), to avoid an infinite loop when, for example, trying to evaluate 100 ms of simulated time, when someone has a setInterval ( . . . , 0) in their code.

Infinite loop detection module 228 may be configured to avoid infinite loops in the code under test (application). The infinite loop detection module 228 may determine a value N or receive a value for N from the user. If there are greater than N of back-to-back calls to time and date functions, such as performance.now( ), Date.now( ) and the simulated time has not changed, then the returned timestamp may be temporarily modified (e.g., add 1 to the returned timestamp). In some embodiments, the returned timestamp may be switched between the true timestamp and the modified timestamp every M number of calls, wherein M is a predetermined number. M may be determined by the infinite loop detection module 228, set by user input or other means of setting a predetermined value. In some embodiments, the switching between the true timestamp and the modified timestamp may be performed until a threshold value, at which point an error may be thrown.

Version comparison module 229 may be configured to record errors or warnings thrown, logged or generated by the application when executing test session using an old application version and a new application version. If there are new errors introduced by code changes between the old application version and the new application version, which were not present previously, then a user or developer may be notified of the discrepancy.

In some embodiments, the version comparison module 229 may be configured to record one or more performance metrics of the old application version and the new application version. In some embodiments, performance metrics may be stored when generating a test session from an execution of the old application version. In some embodiments, a performance metric may be used to monitor for slow frames. Slow frames may be identified based on a metric that counts a number of periods in which the application UI was frozen for greater than 30 ms due to JS code executing for an extended period of time, or the average or p95 values for such frames. Performance metrics may also include standard performance metrics, like time to interactive, the number of re-renders of React components, or the number of forced synchronous layouts.

In some embodiments, the version comparison module may compare these performance metric values when executing a test session using the old application version and the new application version and determine if there are considerable changes in performance. If a performance change has been determined, the developer or user may be notified of the changes.

In some embodiments, performance metrics may also be recorded on other features of the application, for example, accessibility scores and search-engine optimizations.

In some embodiments, comparison of these metrics may be more accurate and useful as a result of the deterministic execution since it isolates noise. The resulting differences in the errors logged, the performance metrics and the accessibility metrics may provide a much more reliable determination that changes to the code caused the differences rather than a random difference due to the randomness in how the test session executes each time.

In some embodiments, the version comparison module 229 may be configured to group and/or deduplicate screenshots taken and screenshot differences generated during the execution/replay of sessions.

Executing a set of session replays may result in 100s or 1000s of screenshots. For example, if a code change touches a large number of screens, then a large number of screenshot differences may be generated, but many of these screenshots may be very similar. It may therefore be useful to group the screenshot differences and show the user/developer just the different types of differences introduced by their code change. In some embodiments, the developer may select one of the shown/displayed different types of differences to view more examples of that type of difference.

In some embodiments, a set of dimensions may be defined. The dimensions may comprise a route pattern the screenshot was captured on (e.g., /companies/<company-id>/orders/<order-id>/receipt) and a signature of the difference. The signature of the differences may be determined based at least in part by taking the HTML at the time of the screenshot before the code change and after the code change and comparing the two HTML structures to detect the differences. In some embodiments, the signature of the differences may comprise one or more signatures of elements, wherein each element signature may be an element which differed or an ancestor of one of the elements containing a difference. For example, when the elements are HTML elements, the signature of HTML elements may include a sorted set of all unique space delimited class names assigned to the 'class' attributes of these elements or a sorted set of all tag names or ids of these HTML elements. In some embodiments, any text content of the HTML elements, URLs etc., may be removed and any repeated direct children of any nodes may be deduplicated. A hash of the resulting HTML content may then be taken to generate the signature of the element. In some embodiments, each element may have a signature generated for it. In other embodiments, the set of elements may have a signature generated for it. In some embodiments, a signature of the set of elements may be generated based on or comprised of one or more signatures of elements. For example, a set of elements may comprise one or more elements. Each element may be hashed to generate an element signature. A signature of the set of elements may then be generated by hashing the signatures of the elements in the set.

By using the signature of differences, text content and URLs, which may vary depending on the data from the test session being used, and varying numbers of repeated children, may be ignored. For example, consider a 'Email <user-email>' button changing from blue to green—for one session the text may be 'Email john@smith.comand for another the text may be Email julie@somewhere.com'—in this case both differences may be grouped together, even though they contain different text. Or consider the case where this button is nested inside a repeating list, one per user. In one session there are 5 users and so 5 list items, and in another session, there are 3 users and so 3 list item—since both sessions are conceptually showing the same difference (the email button changing from blue to green), the screenshot differences may be grouped into the same group.

In some embodiments, the differences may be grouped by one or more dimensions/parameters. The user/developer may select one or more dimensions/parameters to group the differences by. The differences may be grouped into groups and sub-groups using a parent dimension and a child subdimension.

Similarly, screenshots may be grouped into major groups based on the route pattern, and into sub-groups within that based on the unique set of classnames within the HTML that backed each screenshot.

Machine learning module 225 may further comprise training module 226 and session generator module 227.

Machine learning module 225 may be configured to generate or expand one or more test sessions. In some embodiments, the training module 226 may be configured to train a language learning model (LLM), neural network or other machine learning models. In some embodiments, previously recorded sessions, scripted sessions and previously generated AI test sessions may be used as training data by the training module 226. Training may be performed to generate a new model or update a previously generated model. In some embodiments, the training module may receive an updated training set corresponding to the golden set sessions computed by the system. In some embodiments, the updated training set may include some or all of the previously computed golden set of sessions.

In some embodiments, the session generator module 227 may be configured to generate an AI generated session by systematically exploring the possible actions that can be taken from a given starting state, to explore the tree of possible actions. This starting state could be from partway through replaying a session recorded by a user to automatically cover more edge cases on a given or particularly complex screen. Or it could be a fully synthetic session-started by visiting a specific starting URL, by logging into an account with pre-configured credentials, or creating a fresh account with fresh test data, and logging into that.

Given a starting state in a session, the session generator module may be configured to perform the following actions:

Store an 'actionsExecuted' map from 'state id' to a list of pairs of actions taken and the follow on 'state id'/state the action produced (the type of action e.g., click, drag etc. and an identifier for the element the action was performed upon). This stored map allows the generated session to avoid going round in circles or exploring the same conceptual actions multiple times. The 'state id' could be the current URL pattern/route pattern; a 'signature' of the page e.g. the hash of set of unique sorted classnames present, a hash of the actions that are available on the page, the hash of the current character ranges of code executed, an LLM generated description of the state based on the URL and the HTML content of the page, or some combination of the above. In some embodiments, no state id could be used, and we just record a single global list of actions taken.

In some embodiments, an interactionState variable e.g., 'dragging' vs 'not-dragging' could also be stored.

In some embodiments, the session generator module may be configured to examine the screen/HTML to generate the set of alternate actions that can be taken. This set may be generated by:

Hard coded logic (e.g., assume we can click on any element with certain attributes, classnames, or computed style properties; assume we can type in any input; etc.).

Using an LLM with the appropriate prompt (e.g., pass the LLM the HTML of the page, and ask it for the set of actions that can be performed. Each generated action could be a single step consisting of an event type and a CSS selector, or just a human language description, that later gets converted into a sequence of one or more steps).

Using a wider set of recorded user sessions to train or finetune a model to guess which elements can be interacted with (given the details of the element—it's properties, text, the text, computed styles, and properties of its ancestors, and related context in a tree—predict whether the element is interact-able for a given interaction type such as click, drag or drop i.e. a user in *some* session has clicked/dragged/dropped on such an element or not).

At this stage, the session generator module may filter to actions believed to be reversible, and/or non-mutating, and/or non-destructive. All three properties can be predicted by using LLM with an appropriate prompt, and providing the context of the action, the page and the element details.

In some embodiments, predicting actions that are reversible, and/or non-mutating, and/or non-destructive may be performed by other techniques. Detecting reversible actions: by logic e.g., assume changes to inputs & dropdowns are reversible, assume clicks on elements with a HREF and actions which result in it pushing a new state to the browser history or a changed URL are reversible. Detecting non-mutating actions: by training a model on a training set of action which did vs did not result in a PUT or POST request.

In some embodiments, the session generator module may be configured to filter to actions not in the 'actionsExecuted' map for the current state id. This may require using a model (e.g., LLM) to judge if the action is equivalent to one of the ones recorded as having already been taken. For example, when each action is taken, one can ask an LLM to describe the action and what it will test, record that description in the log of actions taken, and then when checking if an action has already been taken feed the LLM the log of descriptions of existing actions taken, the state/state id/URL pattern those actions were taken on, the action to be evaluated (or an LLM generated description of that action), and the current state/state id/URL pattern, and ask it whether the action has already been tested.

The session generator module may further be configured to filter the actions to ones relevant to the current interactionState (e.g., if current 'dragging' then look for actions that would perform a drop). If no actions are left, or some limit of time or number of actions is reached, then terminate, and the session is complete. If no not-yet-executed actions are left, then the system may also check if any already-taken actions lead to state ids where there are actions that have not yet been taken, and if so pick one of those actions to execute.

In some embodiments, the session generator module may be configured to pick one of these actions and execute it and add it to the 'actionsExecuted' map for the current state id. The prioritization could be performed by providing a large language model with a prompt that sets the context ('You are QA testing an application . . . ') and provides the time ordered list of actions already performed, or recent actions performed, the screenshot or HTML of the page, and the set of available actions to take next, and asking it which action it'd take next; or it could perform actions predicted to stay on the current page before it performs an action that would take it to a new page. This prediction could be via logic (e.g., if it has a HREF, it will likely take the agent to a new page), or via training/fine tuning a model on user session data with a training set of actions that did vs did not result in a URL change.

In some cases, such as if the last action was mutating, or not all previous actions at the prior state id have yet been explored, the session generator module may prioritize taking an action sequence that reverts it to the previous state (ask an LLM model, given the previous action taken, the actions available, and the HTML/screen, what action it'd take to revert the changes produced by the previous action; or if a browser history event has been pushed, you pop the last history event to go 'back').

The session generator module may then update the interactionState variable as appropriate (e.g., if started a drag action, then set state to dragging). If the action triggers a PUT or POST request, or a request that looks like it could be mutating then the session generator module may block this request to avoid it mutating data in the database. This block could be removed if the session generator module has provided a safe test account for the AI to operate under, or a method to generate new test accounts with fresh test data as data gets changed/deleted.

By running this search, starting from multiple different starting states that start part way through existing recorded user sessions, session generator module can quickly enrich the existing set of sessions to cover far more edge cases than the sessions originally recorded by the user. These starting states can be collected to cover a maximal variety of URL patterns.

This method could also be modified to combine some of the steps together, and delegate them to a single LLM pass. For example, instead of separately finding elements to take actions on, then filtering them, and then prioritizing them, session generator module could just pass the LLM the current HTML/screen, the set of actions already performed, and ask it, as a QA tester, which action it would perform next to test the application.

In some embodiments, an 'Action' may be formed of a single step/interaction event, or may be an LLM description of multiple steps ("Search for 'test'", "Test accessibility by tabbing back and forth between form fields"), which may then get converted by an LLM into multiple steps (click, type text, hit enter key). In some embodiments, when passing the HTML of the page, it may need to be a trimmed version of the HTML to fit inside the LLMs context window. This may involve stripping data attributes, data URLs, script tags, style tags etc.

Figure 3:
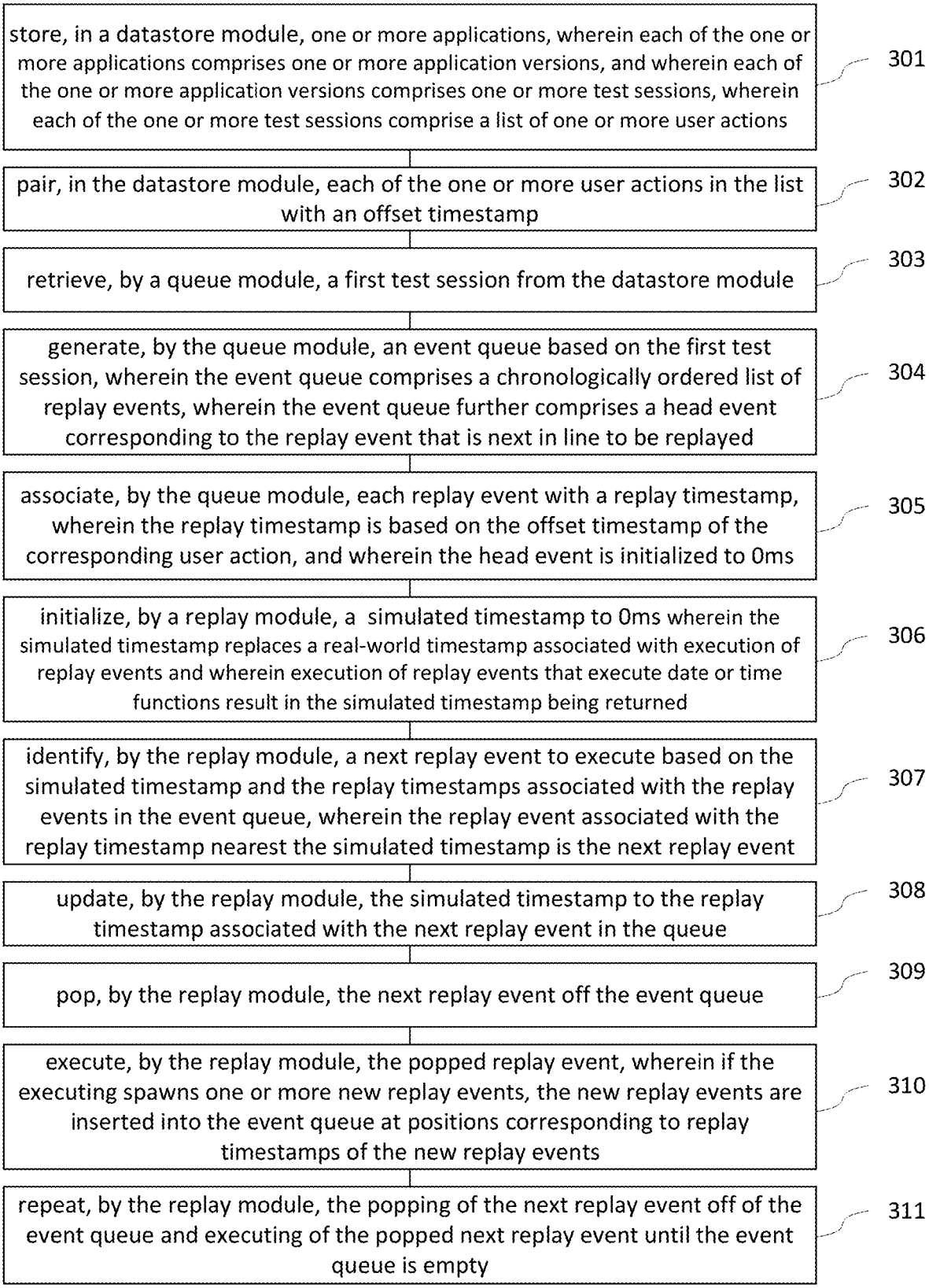
FIG. 3 is a flow chart illustrating an exemplary method that may be performed in accordance with some embodiments.

FIG. 3 is a flow chart illustrating an exemplary method 300 that may be performed in accordance with some embodiments.

At step 301, the system is configured to store, in a datastore module, one or more applications, wherein each of the one or more applications comprises one or more application versions, and wherein each of the one or more application versions comprises one or more test sessions, wherein each of the one or more test sessions comprise a list of one or more user actions.

At step 302, the system is configured to pair, in the datastore module, each of the one or more user actions in the list with an offset timestamp.

At step 303, the system is configured to retrieve, by a queue module, a first test session from the datastore module.

At step 304, the system is configured to generate, by the queue module, an event queue based on the first test session, wherein the event queue comprises a chronologically ordered list of replay events, wherein the event queue further comprises a head event corresponding to the replay event that is next in line to be replayed.

At step 305, the system is configured to associate, by the queue module, each replay event with a replay timestamp, wherein the replay timestamp is based on the offset timestamp of the corresponding user action, and wherein the head event is initialized to 0 ms.

At step 306, the system is configured to initialize, by a replay module, a simulated timestamp to 0 ms wherein the simulated timestamp replaces a real-world timestamp associated with execution of replay events and wherein execution of replay events that execute date or time functions result in the simulated timestamp being returned.

At step 307, the system is configured to identify, by the replay module, a next replay event to execute based on the simulated timestamp and the replay timestamps associated with the replay events in the event queue, wherein the replay event associated with the replay timestamp nearest the simulated timestamp is the next replay event.

At step 308, the system is configured to pop, by the replay module, the next replay event off the event queue.

At step 309, the system is configured to execute, by the replay module, the popped replay event, wherein if the executing spawns one or more new replay events, the new replay events are inserted into the event queue at positions corresponding to a replay timestamp of the new replay events.

At step 310, the system is configured to update, by the replay module, the simulated timestamp to the replay timestamp associated with the next replay event in the queue.

At step 311, the system is configured to repeat, by the replay module, the popping of the next replay event off of the event queue and executing of the popped next replay event until the event queue is empty.

Figure 4:
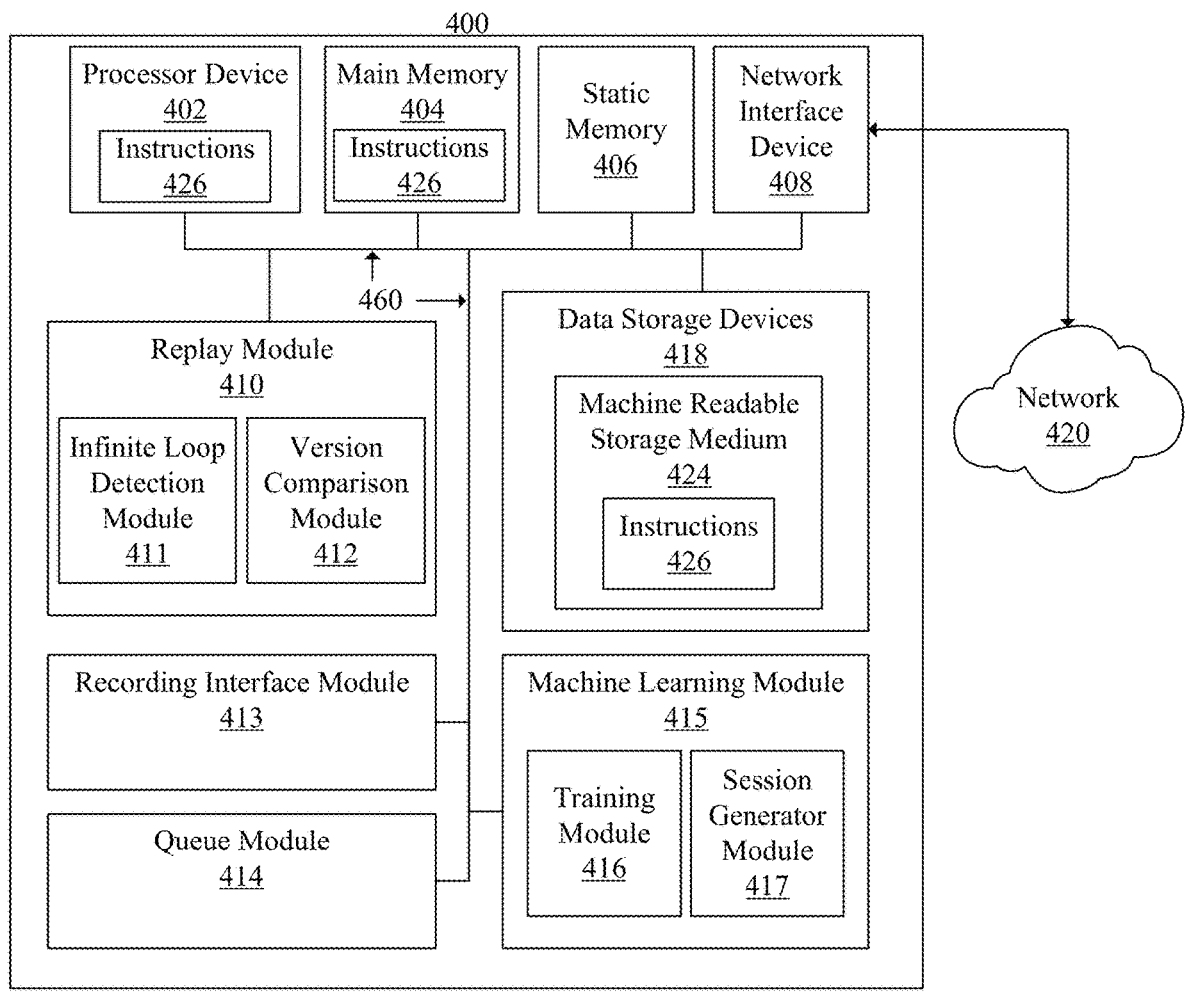
FIG. 4 is a diagram illustrating an exemplary computer/control system that may perform processing in some embodiments and in accordance with aspects of the present disclosure.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 460.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include replay module 410, recording interface module 413 and queue module 414. Replay module 410 may further comprise infinite loop detection module 411 and version comparison module 412. Replay module 410, infinite loop detection module 411, version control module 412 and queue module 414 may be the same or similar to that of replay module 224, infinite loop detection module 228, version control module 229 and queue module 223 as disclosed in FIG. 2B. Recording interface module 413 may be the same or similar to that of recording interface module 204 as disclosed in FIG. 2A. The computer system 400 may further include machine learning module 415. Machine learning module 415 may further comprise training module 416 and session generator module 417. Machine learning module 415, training module 416 and session generator module 417 may be the same or similar to that of machine learning module 225, training module 226 and session generator module 227 as disclosed in FIG. 2B.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media. Information, including data used in the processes and methods of the system and the one or more sets of instructions or software, may also be stored in blockchain, as NFTs or other decentralized technologies.

In one implementation, the instructions 426 include instructions to implement functionality corresponding to the components of a device to perform the disclosure herein. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A system for interacting within an application, the system comprising: a datastore module, operating on a server, wherein the datastore module is configured to: store one or more applications, wherein each of the one or more applications comprises one or more application versions, and wherein each of the one or more application versions comprises one or more test sessions, wherein each of the one or more test sessions comprise a list of one or more user actions and wherein each of the one or more user actions is paired with an offset timestamp; a queue module, wherein the queue module is configured to: retrieve, from the datastore module, a first test session; generate an event queue based on the first test session, wherein the event queue comprises a chronologically ordered list of replay events, wherein the event queue further comprises a head event corresponding to the replay event that is next in line to be replayed; associate each replay event with a replay timestamp, wherein the replay timestamp is based on the offset timestamp of the corresponding user action, and wherein the head event is initialized to 0 ms; a replay module configured to interact with the application through executing, by the application, the event queue corresponding to the first test session and wherein the replay module is further configured to: initialize a simulated timestamp to 0 ms, wherein the simulated timestamp replaces a real-world timestamp associated with execution of replay events and wherein execution of replay events that execute date or time functions result in the simulated timestamp being returned; identify a next replay event to execute based on the simulated timestamp and the replay timestamps associated with the replay events in the event queue, wherein the replay event associated with the replay timestamp nearest the simulated timestamp is the next replay event; update the simulated timestamp to the replay timestamp associated with the next replay event in the queue; pop the next replay event off the event queue; execute the popped replay event, wherein if the executing spawns one or more new replay events, the new replay events are inserted into the event queue at positions corresponding to replay timestamps of the new replay events; and repeat the popping of the next replay event off of the event queue and executing of the popped next replay event until the event queue is empty.

Example 2. The system of Example 1, wherein the replay timestamp of the new replay events are determined based on event details corresponding to the new replay events or the replay event that spawned the new replay events, and a type of action performed by the replay event that spawned the new replay events or by a type of action to be performed by the new replay events.

Example 3. The system of any one of Examples 1-2, wherein the replay timestamp of each of the new replay events is equal to a specified delay added to the simulated timestamp, wherein the specified delay is specified by the replay event that spawned the new replay event or by the new replay event.

Example 4. The system of any one of Examples 1-3, wherein the replay timestamps of the new replay events are equal to the simulated timestamp plus a recorded delay corresponding to the replay event that spawned the new replay event in the first test session.

Example 5. The system of any one of Examples 1-4, wherein the replay event is a network request and the new replay event is a new network response; and wherein the specified delay corresponding to the new network response is calculated by identifying a closest matching network request in the first test session and calculating an amount of time between sending of the identified closest matching network request and receiving an associated response in the first test session.

Example 6. The system of any one of Examples 1-5, wherein the replay module is further configured to: identify one or more pending actions, calculations or replay event executions that take a non-deterministic amount of time to complete; and pause the updating of the simulated timestamp, the popping of the next replay event and the execution of the next replay event until the identified one or more pending actions, calculations or replay event executions have completed.

Example 7. The system of any one of Examples 1-6, wherein the one or more pending actions, calculations or replay event executions comprise executing code, callbacks, waiting for network responses, parsing network responses, waiting for additional scripts or code to load, parse and execute, and rendering animations.

Example 8. The system of any one of Examples 1-7, wherein the replay module is further configured to: identify one or more sources of non-determinism corresponding to the popped replay event, wherein the one or more sources of non-determinism include non-deterministic function calls; intercept the non-deterministic function calls; and replace the non-deterministic function calls with calls to one or more predetermined deterministic functions.

Example 9. The system of any one of Examples 1-8, wherein the non-deterministic function calls are animation requests, wherein the animation requests generate one or more callbacks and wherein the generated one or more callbacks are stored in a separate callback queue.

Example 10. The system of any one of Examples 1-9, wherein the replay module is further configured to trigger a simulated animation frame, wherein the triggering comprises: increasing a simulated animation time variable by a predetermined amount; passing the simulated animation time to the callbacks stored in the callback queue; triggering the callbacks using the passed simulated animation time; and clearing the callbacks stored in the callback queue.

Example 11. The system of any one of Examples 1-10, wherein the one or more test sessions further comprise a list of one or more user actions.

Example 12. The system of any one of Examples 1-11, wherein the one or more test sessions correspond to previously recorded user sessions, script generated test sessions or AI generated test sessions.

Example 13. The system of any one of Examples 1-12, wherein the replay module is further configured to: pause and wait for any open network requests to complete before popping the next replay event off of the event queue, wherein the completing comprises receiving responses corresponding to the open network requests and parsing of the responses.

Example 14. The system of any one of Examples 1-13, wherein the replay module is further configured to take one or more snapshots of a state of the application following or preceding execution of key user actions.

Example 15. The system of any one of Examples 1-14, wherein the key user actions correspond to user actions that result in a document object model (DOM) change since a previous snapshot was taken.

Example 16. The system of any one of Examples 1-15, wherein each of the one or more snapshots comprise a screenshot of the application, a dump of the DOM model, execution logs or performance logs.

Example 17. The system of any one of Examples 1-16, wherein the replay module further comprises an infinite loop detection module, the infinite loop detection module configured to: monitor execution of each replay event in the event queue; determine that an infinite loop is present, wherein the determining is based on identifying a predetermined number of repeated executions of date or time functions that return an unchanged simulated timestamp value; break the infinite loop, wherein breaking the infinite loop comprises: temporarily modifying the simulated timestamp returned by execution of the date or time functions, wherein the modifying comprises adding or subtracting a predetermined value to the simulated timestamp; switching between the modified simulated timestamp and the unmodified simulated timestamp after a second predetermined number of executions of time or date functions; and throw an error after a third number of predefined executions have been performed that return the modified simulated timestamp or the unmodified simulated timestamp.

Example 18. The system of any one of Examples 1-17, wherein the replay module is further configured to: execute, by a first application version and a second application version, a set of test sessions; record, for the first application version and the second application version, snapshots of the state of the applications, events or metrics when executing the set of test session; compare, by a version comparison module operating on the replay module, the snapshots of the state of the applications, events or metrics corresponding to the first application version with the snapshots of the state of the applications, events or metrics corresponding to the second application version; and generate a notification when the second application version generates different results to the first application version.

Example 19. The system of any one of Examples 1-18, wherein the replay module is further configured to: record data for the first application version and the second application version, wherein the recording of data for the first application version and the second application version comprise: recording one or more errors or warnings thrown, logged or generated for each of the first application version and the second application version when executing the set of test session; recording screenshots of the first application version and second application version when executing the set of test session; or recording metrics of the performance of the first application version and the second application version, wherein the metrics comprise slow frames, time to interactive, number of re-renders, number of forced synchronous layouts, accessibility scores or search-engine optimizations; and compare, by the version comparison module, the data recorded for the first application version with data recorded for the second application version; and generate, based on the comparing the data recorded for the first application version and the data recorded for the second application version, a notification of any notable changes in that recorded data.

Example 20. The system of any one of Examples 1-19, wherein the queue module is further configured to: select, for a first application version, one or more test session to execute based on one or more selection criteria, and wherein the selection criteria comprises: source code coverage; URL patterns; execution time; and replay accuracy.

Example 21. The system of any one of Examples 1-20, wherein the server is further configured to compute, for each of the one or more applications, a current golden set of sessions and a timestamp corresponding to computing the current golden set; and wherein the current golden set is computed based on one or more selection criteria.

Example 22. The system of any one of Examples 1-21, wherein the server is further configured to compute, for an updated application, an updated golden set of sessions and a timestamp corresponding to computing the updated golden set, and wherein computing the updated golden set comprises: finding new candidate sessions, wherein finding new candidate sessions comprises identifying test sessions that have been added to the updated application since the timestamp of the current golden set; generating a set of replay sessions, wherein the replay sessions comprise the new candidate sessions and the current golden set of sessions; replaying the set of replay sessions; computing a score for each replay session; selecting, based on the score, the updated golden set of sessions; and storing the updated golden set of sessions and a current timestamp corresponding to the updated golden set of sessions.

Example 23. The system of any one of Examples 1-22, the replay module is further configured to execute, by a first application version and a second application version, a set of test sessions; record, for the first application version and the second application version, when executing the set of test session, a plurality of screenshots of the applications along with plurality of snapshots of the state of the applications at the time of screenshotting; compare, by a version comparison module operating on the replay module, each of the plurality of screenshots and the plurality of state snapshots corresponding to the first application version with the plurality of screenshots and the plurality of state snapshots of the state of the applications corresponding the second application version; and classify the plurality of these comparisons into one or more groups, based on the screenshots or the state snapshots from when the screenshot was taken; and display, for each of the one or more groups, one or more representative screenshots to a user.

Example 24. The system of any one of Examples 1-23, wherein when each screenshot is recorded, the system records snapshots of the DOM at that point in time and/or details of lines/characters of application code executed since the prior screenshot was taken; and wherein the version comparison module is further configured to compare the DOM snapshots between the first and second application version, wherein the DOM snapshot comparison further comprises generating a 'DOM change signature', where the DOM change signature strips out data, text or variations in the number of repeated elements that vary without bound across user sessions while preserving elements that differentiate between different code paths and edge cases having been activated; and wherein the classifying is further based on the lines/characters of application code executed since the prior screenshot, or based on the DOM change signatures.

Example 25. The system of any one of Examples 1-24, wherein the system further comprises a machine learning module, wherein the machine learning module is configured to generate AI generated test sessions, and wherein the generating a new AI test session comprises: creating a user action list for the new AI test session, wherein the user action list is a chronologically ordered list; creating a current session state of the new AI test session; analyzing the current session state; generating an action/executed map for the current session state, wherein the action/executed map comprises a list of action pairs and wherein each action pair comprise an action taken and a produced state; generating, based on the analysis, a list of alternate actions that can be taken from the current session state; identifying, from the list of alternate actions, a set of filter actions wherein the set of filter actions comprise reversible actions, non-mutating actions or non-destructive actions; identifying a set of unexecuted actions, wherein the identifying comprises comparing the set of filter actions to the action/executed map; selecting an unexecuted action from the set of unexecuted actions; executing the selected unexecuted action; adding the selected unexecuted action to the user action list; adding, for the current session state, the selected unexecuted action to the action/executed map; and repeating, while the set of unexecuted actions is not empty, a predefined session length limit has not yet been reached or a predetermined search depth has not yet been reached, the identifying, selecting and executing of unexecuted actions and adding the selected unexecuted action to the user action list and the action/executed map of the current session state.

Example 26. The system of any one of Examples 1-25, wherein the produced state corresponds to a URL pattern, and the action taken corresponds to descriptors of buttons that are clicked or elements that are interacted with. machine learning module is further configured to expand previously recorded user sessions and script generated test sessions.

Example 27. The system of any one of Examples 1-26, wherein the machine learning module is further configured to expand previously recorded user sessions and script generated test sessions.

Example 28. A method for interacting within an application, the method comprising: storing, in a datastore module operating on a server, one or more applications, wherein each of the one or more applications comprises one or more application versions, and wherein each of the one or more application versions comprises one or more test sessions, wherein each of the one or more test sessions comprise a list of one or more user actions and wherein each of the one or more user actions is paired with an offset timestamp; retrieving, by a queue module, a first test session from the datastore module; generating an event queue based on the first test session, wherein the event queue comprises a chronologically ordered list of replay events, wherein the event queue further comprises a head event corresponding to the replay event that is next in line to be replayed; associating each replay event with a replay timestamp, wherein the replay timestamp is based on the offset timestamp of the corresponding user action, and wherein the head event is initialized to 0 ms; interacting with the application through executing the application, on a replay module, the event queue corresponding to the first test session and wherein the replay module is further configured to: initialize a simulated timestamp to 0 ms, wherein the simulated timestamp replaces a real-world timestamp associated with execution of replay events and wherein execution of replay events that execute date or time functions result in the simulated timestamp being returned; identify a next replay event to execute based on the simulated timestamp and the replay timestamps associated with the replay events in the event queue, wherein the replay event associated with the replay timestamp nearest the simulated timestamp is the next replay event; update the simulated timestamp to the replay timestamp associated with the next replay event in the queue; pop the next replay event off the event queue; execute the popped replay event, wherein if the executing spawns one or more new replay events, the new replay events are inserted into the event queue at positions corresponding to replay timestamps of the new replay events; and repeat the popping of the next replay event off of the event queue and executing of the popped next replay event until the event queue is empty.

Example 29. The method of Example 28, wherein the replay timestamp of the new replay events are determined based on event details corresponding to the new replay events or the replay event that spawned the new replay events, and a type of action performed by the replay event that spawned the new replay events or by a type of action to be performed by the new replay events.

Example 30. The method of any one of Examples 28-29, wherein the replay timestamp of each of the new replay events is equal to a specified delay added to the simulated timestamp, wherein the specified delay is specified by the replay event that spawned the new replay event or by the new replay event.

Example 31. The method of any one of Examples 28-30, wherein the replay timestamps of the new replay events are equal to the simulated timestamp plus a recorded delay corresponding to the replay event that spawned the new replay event in the first test session.

Example 32. The method of any one of Examples 28-31, wherein the replay event is a network request and the new replay event is a new network response; and wherein the specified delay corresponding to the new network response is calculated by identifying a closest matching network request in the first test session and calculating an amount of time between sending of the identified closest matching network request and receiving an associated response in the first test session.

Example 33. The method of any one of Examples 28-32, wherein the replay module is further configured to: identify one or more pending actions, calculations or replay event executions that take a non-deterministic amount of time to complete; and pause the updating of the simulated timestamp, the popping of the next replay event and the execution of the next replay event until the identified one or more pending actions, calculations or replay event executions have completed.

Example 34. The method of any one of Examples 28-33, wherein the one or more pending actions, calculations or replay event executions comprise executing code, callbacks, waiting for network responses, parsing network responses, waiting for additional scripts or code to load, parse and execute, and rendering animations.

Example 35. The method of any one of Examples 28-34, wherein the replay module is further configured to: identify one or more sources of non-determinism corresponding to the popped replay event, wherein the one or more sources of non-determinism include non-deterministic function calls; intercept the non-deterministic function calls; and replace the non-deterministic function calls with calls to one or more predetermined deterministic functions.

Example 36. The method of any one of Examples 28-35, wherein the non-deterministic function calls are animation requests, wherein the animation requests generate one or more callbacks and wherein the generated one or more callbacks are stored in a separate callback queue.

Example 37. The method of any one of Examples 28-36, wherein the replay module is further configured to trigger a simulated animation frame, wherein the triggering comprises: increasing a simulated animation time variable by a predetermined amount; passing the simulated animation time to the callbacks stored in the callback queue; triggering the callbacks using the passed simulated animation time; and clearing the callbacks stored in the callback queue.

Example 38. The method of any one of Examples 28-37, wherein the one or more test sessions further comprise a list of one or more user actions.

Example 39. The method of any one of Examples 28-38, wherein the one or more test sessions correspond to previously recorded user sessions, script generated test sessions or AI generated test sessions.

Example 40. The method of any one of Examples 28-39, wherein the replay module is further configured to: pause and wait for any open network requests to complete before popping the next replay event off of the event queue, wherein the completing comprises receiving responses corresponding to the open network requests and parsing of the responses.

Example 41. The method of any one of Examples 28-40, wherein the replay module is further configured to take one or more snapshots of a state of the application following or preceding execution of key user actions.

Example 42. The method of any one of Examples 28-41, wherein the key user actions correspond to user actions that result in a document object model (DOM) change since a previous snapshot was taken.

Example 43. The method of any one of Examples 28-42, wherein each of the one or more snapshots comprise a screenshot of the application, a dump of the DOM model, execution logs or performance logs.

Example 44 The method of any one of Examples 28-43, wherein the replay module further comprises an infinite loop detection module, the infinite loop detection module configured to: monitor execution of each replay event in the event queue; determine that an infinite loop is present, wherein the determining is based on identifying a predetermined number of repeated executions of date or time functions that return an unchanged simulated timestamp value; break the infinite loop, wherein breaking the infinite loop comprises: temporarily modifying the simulated timestamp returned by execution of the date or time functions, wherein the modifying comprises adding or subtracting a predetermined value to the simulated timestamp; switching between the modified simulated timestamp and the unmodified simulated timestamp after a second predetermined number of executions of time or date functions; and throw an error after a third number of predefined executions have been performed that return the modified simulated timestamp or the unmodified simulated timestamp.

Example 45. The method of any one of Examples 28-44, wherein the replay module is further configured to: execute, by a first application version and a second application version, a set of test sessions; record, for the first application version and the second application version, snapshots of the state of the applications, events or metrics when executing the set of test session; compare, by a version comparison module operating on the replay module, the snapshots of the state of the applications, events or metrics corresponding to the first application version with the snapshots of the state of the applications, events or metrics corresponding the second application version; and generate an error notification when the second application version generates different results to the first application version.

Example 46. The method of any one of Examples 28-45, wherein the replay module is further configured to: record data for the first application version and the second application version, wherein the recording of data for the first application version and the second application version comprises: recording one or more errors or warnings thrown, logged or generated for each of the first application version and the second application version when executing the set of test session; recording screenshots of the first application version and second application version when executing the set of test session; or recording metrics of the performance of the first application version and the second application version, wherein the metrics comprise slow frames, time to interactive, number of re-renders, number of forced synchronous layouts, accessibility scores, or search-engine optimizations; and compare, by the version comparison module, the data recorded for the first application version with the data recorded for the second application version; and generate, based on the comparing the data recorded for the first application version and the data recorded for the second application version, a notification of any notable changes in that recorded data.

Example 47. The method of any one of Examples 28-46, wherein the queue module is further configured to: select, for a first application version, one or more test session to execute based on one or more selection criteria, and wherein the selection criteria comprises: source code coverage; URL patterns; execution time; and replay accuracy.

Example 48. The method of any one of Examples 28-47, wherein the server is further configured to compute, for each of the one or more applications, a current golden set of sessions and a timestamp corresponding to computing the current golden set; and wherein the current golden set is computed based on one or more selection criteria.

Example 49. The method of any one of Examples 28-48, wherein the server is further configured to compute, for an updated application, an updated golden set of sessions and a timestamp corresponding to computing the updated golden set, and wherein computing the updated golden set comprises: finding new candidate sessions, wherein finding new candidate sessions comprises identifying test sessions that have been added to the updated application since the timestamp of the current golden set; generating a set of replay sessions, wherein the replay sessions comprise the new candidate sessions and the current golden set of sessions; replaying the set of replay sessions; computing a score for each replay session; selecting, based on the score, the updated golden set of sessions; and storing the updated golden set of sessions and a current timestamp corresponding to the updated golden set of sessions.

Example 50. The method of any one of Examples 28-49, the replay module is further configured to execute, by a first application version and a second application version, a set of test sessions; record, for the first application version and the second application version, when executing the set of test session, a plurality of screenshots of the applications along with plurality of snapshots of the state of the applications at the time of screenshotting; compare, by a version comparison module operating on the replay module, each of the plurality of screenshots and the plurality of state snapshots corresponding to the first application version with the plurality of screenshots and the plurality of state snapshots of the state of the applications corresponding the second application version; and classify the plurality of these comparisons into one or more groups, based on the screenshots or the state snapshots from when the screenshot was taken; and display, for each of the one or more groups, one or more representative screenshots to a user.

Example 51. The method of any one of Examples 28-50, wherein when each screenshot is recorded, the system records snapshots of the DOM at that point in time and/or details of lines/characters of application code executed since the prior screenshot was taken; and wherein the version comparison module is further configured to compare the DOM snapshots between the first and second application version, wherein the DOM snapshot comparison further comprises generating a 'DOM change signature', where the DOM change signature strips out data, text or variations in the number of repeated elements that vary without bound across user sessions while preserving elements that differentiate between different code paths and edge cases having been activated; and wherein the classifying is further based on the lines/characters of application code executed since the prior screenshot, or based on the DOM change signatures.

Example 52. The method of any one of Examples 28-51, wherein the system further comprises a machine learning module, wherein the machine learning module is configured to generate AI generated test sessions, and wherein the generating a new AI test session comprises: creating a user action list for the new AI test session, wherein the user action list is a chronologically ordered list; creating a current session state of the new AI test session; analyzing the current session state; generating an action/executed map for the current session state, wherein the action/executed map comprises a list of action pairs and wherein each action pair comprise an action taken and a produced state; generating, based on the analysis, a list of alternate actions that can be taken from the current session state; identifying, from the list of alternate actions, a set of filter actions wherein the set of filter actions comprise reversible actions, non-mutating actions or non-destructive actions; identifying a set of unexecuted actions, wherein the identifying comprises comparing the set of filter actions to the action/executed map; selecting an unexecuted action from the set of unexecuted actions; executing the selected unexecuted action; adding the selected unexecuted action to the user action list; adding, for the current session state, the selected unexecuted action to the action/executed map; and repeating, while the set of unexecuted actions is not empty, a predefined session length limit has not yet been reached or a predetermined search depth has not yet been reached, the identifying, selecting and executing of unexecuted actions and adding the selected unexecuted action to the user action list and the action/executed map of the current session state.

Example 53. The method of any one of Examples 28-52, wherein the produced state corresponds to a URL pattern, and the action taken corresponds to descriptors of buttons that are clicked or elements that are interacted with.

Example 54. The method of any one of Examples 28-53, wherein the machine learning module is further configured to expand previously recorded user sessions and script generated test sessions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system for interacting within an application, the system comprising a processor and a memory storing:
   a datastore module, operating on a server, wherein the datastore module is configured to:
     store one or more applications, wherein each of the one or more applications comprises one or more application versions, and wherein each of the one or more application versions comprises one or more test sessions, wherein each of the one or more test sessions comprise a list of one or more user actions and wherein each of the one or more user actions is paired with an offset timestamp;
   a queue module, wherein the queue module is configured to:
     retrieve, from the datastore module, a first test session;
     generate an event queue based on the first test session, wherein the event queue comprises a chronologically ordered list of replay events, wherein the event queue further comprises a head event corresponding to the replay event that is next in line to be replayed; and
     associate each replay event with a replay timestamp, wherein the replay timestamp is based on the offset timestamp of the corresponding user action, and wherein the head event is initialized to 0 milliseconds (ms);
   a replay module configured to interact with the application through executing, by the application, the event queue corresponding to the first test session and wherein the replay module is further configured to:
     initialize a simulated timestamp to 0 ms, wherein the simulated timestamp replaces a real-world timestamp associated with execution of replay events and wherein execution of replay events that execute date or time functions result in the simulated timestamp being returned;
     identify a next replay event to execute based on the simulated timestamp and the replay timestamps associated with the replay events in the event queue, wherein the replay event associated with the replay timestamp nearest the simulated timestamp is the next replay event;
     update the simulated timestamp to the replay timestamp associated with the next replay event in the queue;
     pop the next replay event off the event queue;
     execute the popped replay event, wherein if the executing spawns one or more new replay events, the new replay events are inserted into the event queue at positions corresponding to replay timestamps of the new replay events; and
     repeat the popping of the next replay event off of the event queue and executing of the popped next replay event until the event queue is empty.

2. The system of claim 1, wherein the replay timestamp of the new replay events are determined based on event details corresponding to the new replay events or the replay event that spawned the new replay events, and a type of action performed by the replay event that spawned the new replay events or by a type of action to be performed by the new replay events.

3. The system of claim 2, wherein the replay timestamp of each of the new replay events is equal to a specified delay added to the simulated timestamp, wherein the specified delay is specified by the replay event that spawned the new replay event or by the new replay event.

4. The system of claim 2, wherein the replay timestamp of the new replay events are equal to the simulated timestamp plus a recorded delay corresponding to the replay event that spawned the new replay event in the first test session.

5. The system of claim 4, wherein the replay event is a network request and the new replay event is a new network response; and
wherein the specified delay corresponding to the new network response is calculated by identifying a closest matching network request in the first test session and calculating an amount of time between sending of the identified closest matching network request and receiving an associated response in the first test session.

6. The system of claim 1, wherein the replay module is further configured to:
identify one or more pending actions, calculations or replay event executions that take a non-deterministic amount of time to complete; and
pause the updating of the simulated timestamp, the popping of the next replay event and the execution of the next replay event until the identified one or more pending actions, calculations or replay event executions have completed.

7. The system of claim 6, wherein the one or more pending actions, calculations or replay event executions comprise executing code, callbacks, waiting for network responses, parsing network responses, waiting for additional scripts or code to load, parse and execute, and rendering animations.

8. The system of claim 6, wherein the replay module is further configured to:
pause and wait for any open network requests to complete before popping the next replay event off of the event queue, wherein the completing comprises receiving responses corresponding to the open network requests and parsing of the responses.

9. The system of claim 1, wherein the replay module is further configured to:
identify one or more sources of non-determinism corresponding to the popped replay event, wherein the one or more sources of non-determinism include non-deterministic function calls;
intercept the non-deterministic function calls; and
replace the non-deterministic function calls with calls to one or more predetermined deterministic functions.

10. The system of claim 9, wherein the non-deterministic function calls are animation requests, wherein the animation requests generate one or more callbacks and wherein the generated one or more callbacks are stored in a separate callback queue.

11. The system of claim 10, wherein the replay module is further configured to trigger a simulated animation frame, wherein the triggering comprises:
increasing a simulated animation time variable by a predetermined amount;
passing the simulated animation time to the callbacks stored in the callback queue;
triggering the callbacks using the passed simulated animation time; and
clearing the callbacks stored in the callback queue.

12. The system of claim 1, wherein the one or more test sessions further comprise a list of one or more user actions.

13. The system of claim 12, wherein the one or more test sessions correspond to previously recorded user sessions, script generated test sessions or AI generated test sessions.

14. The system of claim 13, wherein the system further comprises a machine learning module, wherein the machine learning module is configured to generate AI generated test sessions, and wherein the generating a new AI test session comprises:
creating a user action list for the new AI test session, wherein the user action list is a chronologically ordered list;
creating a current session state of the new AI test session;
analyzing the current session state;
generating an action/executed map for the current session state, wherein the action/executed map comprises a list of action pairs and wherein each action pair comprises an action taken and a produced state;
generating, based on the analysis, a list of alternate actions that can be taken from the current session state;
identifying, from the list of alternate actions, a set of filter actions wherein the set of filter actions comprise reversible actions, non-mutating actions or non-destructive actions;
identifying a set of unexecuted actions, wherein the identifying comprises comparing the set of filter actions to the action/executed map;
selecting an unexecuted action from the set of unexecuted actions;
executing the selected unexecuted action;
adding the selected unexecuted action to the user action list;
adding, for the current session state, the selected unexecuted action to the action/executed map; and
repeating, while the set of unexecuted actions is not empty, a predefined session length limit has not yet been reached or a predetermined search depth has not yet been reached, the identifying, selecting and executing of unexecuted actions and adding the selected unexecuted action to the user action list and the action/executed map of the current session state.

15. The system of claim 14, wherein the produced state corresponds to a URL pattern, and the action taken corresponds to descriptors of buttons that are clicked or elements that are interacted with.

16. The system of claim 15, wherein the machine learning module is further configured to expand previously recorded user sessions and script generated test sessions.

17. The system of claim 1, wherein the replay module is further configured to take one or more snapshots of a state of the application following or preceding execution of key user actions.

18. The system of claim 17, wherein the key user actions correspond to user actions that result in a document object model (DOM) change since a previous snapshot was taken.

19. The system of claim 17, wherein each of the one or more snapshots comprise a screenshot of the application, a dump of a document object model (DOM), execution logs or performance logs.

20. The system of claim 19, the replay module is further configured to execute, by a first application version and a second application version, a set of test sessions;
record, for the first application version and the second application version, when executing the set of test session, a plurality of screenshots of the applications along with plurality of snapshots of the state of the applications at the time of screenshotting;

compare, by a version comparison module operating on the replay module, each of the plurality of screenshots and the plurality of state snapshots corresponding to the first application version with the plurality of screenshots and the plurality of state snapshots of the state of the applications corresponding the second application version; and classify the plurality of these comparisons into one or more groups, based on the screenshots or the state snapshots from when the screenshot was taken; and display, for each of the one or more groups, one or more representative screenshots to a user.

21. The system of claim 20, wherein when each screenshot is recorded, the system records snapshots of the DOM at that point in time and/or details of lines/characters of application code executed since the prior screenshot was taken; and wherein the version comparison module is further configured to compare the DOM snapshots between the first and second application version, wherein the DOM snapshot comparison further comprises generating a 'DOM change signature', where the DOM change signature strips out data, text or variations in the number of repeated elements that vary without bound across user sessions while preserving elements that differentiate between different code paths and edge cases having been activated; and wherein the classifying is further based on the lines/characters of application code executed since the prior screenshot or based on the DOM change signatures.

22. The system of claim 17, wherein the replay module is further configured to:

execute, by a first application version and a second application version, a set of test sessions;

record, for the first application version and the second application version, snapshots of the state of the applications, events or metrics when executing the set of test session;

compare, by a version comparison module operating on the replay module, the snapshots of the state of the applications, events or metrics corresponding to the first application version with the snapshots of the state of the applications, events or metrics corresponding the second application version; and generate a notification when the second application version generates different results to the first application version.

23. The system of claim 22, wherein the replay module is further configured to:

record data for the first application version and the second application version, wherein the recording of data for the first application version and the second application version comprises:

recording one or more errors or warnings thrown, logged or generated for each of the first application version and the second application version when executing the set of test session;

recording screenshots of the first application version and second application version when executing the set of test session; or recording metrics of the performance of the first application version and the second application version, wherein the metrics comprise slow frames, time to interactive, number of re-renders, number of forced synchronous layouts, accessibility scores or search-engine optimizations; and compare, by the version comparison module, the data recorded for the first application version with the data recorded for the second application version; and generate, based on the comparing the data recorded for the first application version and the data for the second application version, a notification of any notable changes in that recorded data.

24. The system of claim 1, wherein the replay module further comprises an infinite loop detection module, the infinite loop detection module configured to:

monitor execution of each replay event in the event queue;

determine that an infinite loop is present, wherein the determining is based on identifying a predetermined number of repeated executions of date or time functions that return an unchanged simulated timestamp value;

break the infinite loop, wherein breaking the infinite loop comprises:

temporarily modifying the simulated timestamp returned by execution of the date or time functions, wherein the modifying comprises adding or subtracting a predetermined value to the simulated timestamp;

switching between the modified simulated timestamp and the unmodified simulated timestamp after a second predetermined number of executions of time or date functions; and throw an error after a third number of predefined executions have been performed that return the modified simulated timestamp or the unmodified simulated timestamp.

25. The system of claim 1, wherein the queue module is further configured to:

select, for a first application version, one or more test session to execute based on one or more selection criteria, and wherein the selection criteria comprises:

source code coverage;

URL patterns;

execution time; and replay accuracy.

26. The system of claim 1, wherein the server is further configured to compute, for each of the one or more applications, a current golden set of sessions and a timestamp corresponding to computing the current golden set; and wherein the current golden set is computed based on one or more selection criteria.

27. The system of claim 26, wherein the server is further configured to compute, for an updated application, an updated golden set of sessions and a timestamp corresponding to computing the updated golden set, and wherein computing the updated golden set comprises:

finding new candidate sessions, wherein finding new candidate sessions comprises identifying test sessions that have been added to the updated application since the timestamp of the current golden set;

generating a set of replay sessions, wherein the replay sessions comprise the new candidate sessions and the current golden set of sessions;

replaying the set of replay sessions;

computing a score for each replay session;

selecting, based on the score, the updated golden set of sessions; and storing the updated golden set of sessions and a current timestamp corresponding to the updated golden set of sessions.

* * * * *